March 21, 1950 J. O. MOORHEAD 2,501,185
TEMPERATURE AND PRESSURE OPERATED VALVE
Filed Dec. 7, 1945 2 Sheets-Sheet 1
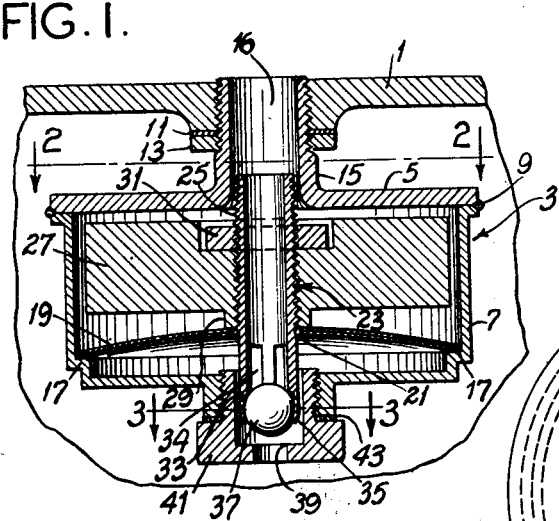
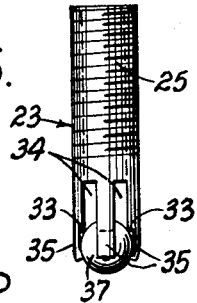
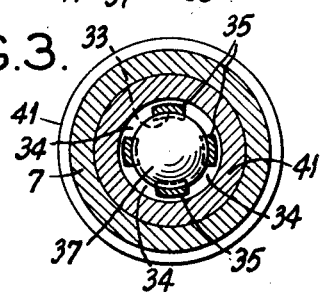
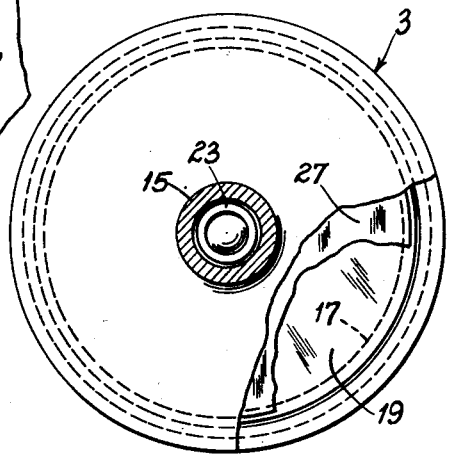
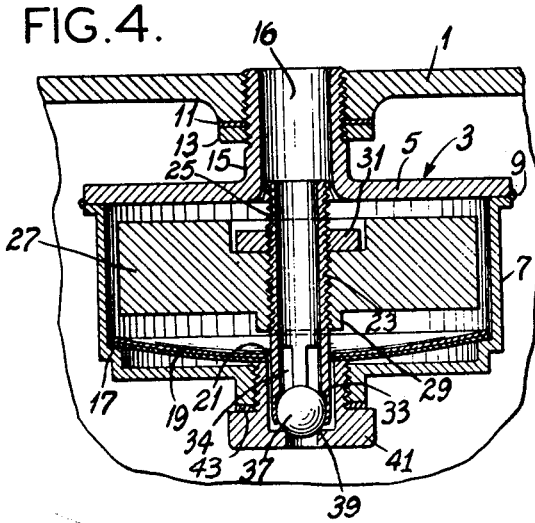
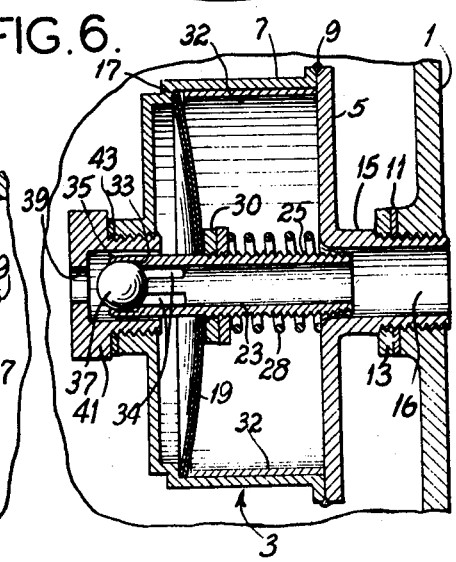
John O. Moorhead,
Inventor.
Haynes and Koenig
Attorneys.

March 21, 1950   J. O. MOORHEAD   2,501,185
TEMPERATURE AND PRESSURE OPERATED VALVE
Filed Dec. 7, 1945   2 Sheets-Sheet 2

Patented Mar. 21, 1950

2,501,185

UNITED STATES PATENT OFFICE 2,501,185

TEMPERATURE AND PRESSURE OPERATED VALVE

John O. Moorhead, Attleboro, Mass., assignor to Metals & Controls Corporation, Attleboro, Mass., a corporation of Massachusetts Application December 7, 1945, Serial No. 633,372

9 Claims. (Cl. 236—92)

This invention relates to valves and more particularly to relief valves.

Among the objects of the invention may be noted the provision of an improved pressure relief valve; the provision of a valve of the character indicated which responds both to temperature and pressure; the provision of a pressure relief valve which will remain open until a predetermined temperature is reached and will then close; the provision of a valve of the character indicated which automatically closes upon reaching one temperature and automatically opens upon a subsequent decrease in temperature, while responding to pressure at temperatures above that first referred to; and, the provision of a valve of the class described which may be easily constructed of readily available materials. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a section through one form of the valve of the present invention showing it installed in a pressure chamber;

Fig. 2 is a section taken on line 2—2 on Fig. 1, some parts being broken away;

Fig. 3 is a section taken on line 3—3 on Fig. 1;

Fig. 4 is a view similar to Fig. 1 but showing the mechanism in a different position;

Fig. 5 is an elevation of the valve element;

Fig. 6 is a section similar to Fig. 1 but turned 90° and showing a different form of the invention;

Similar reference characters indicate corresponding parts throughout the several views of the drawings.

Figure 7:
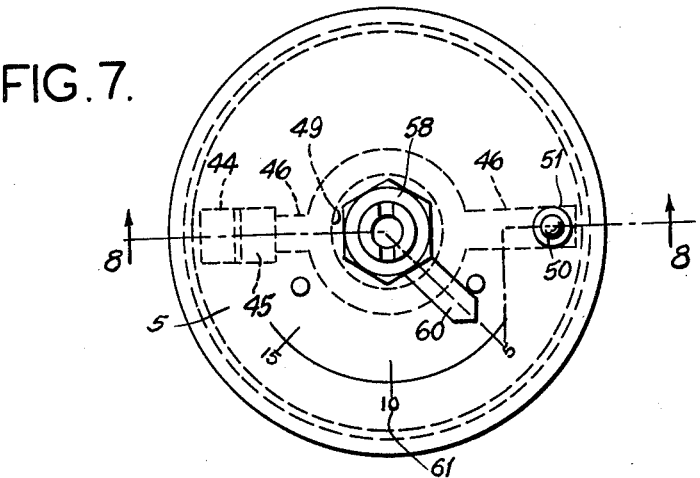
Fig. 7 is a top plan of an alternative embodiment.

It is customary to use a pressure relief valve of some type on most pressure vessels, such as pressure cookers. Such a pressure valve is designed to open when a pressure is reached above which danger would occur, and in most instances is designed to reclose when the pressure falls below this predetermined point. In such valves, however, the function has been merely to relieve pressure, and once the pressure is relieved the valve in most instances recloses.

In the operation of certain pressure vessels, such as a pressure cooker, as the temperature of the interior rises the air within the vessel expands and for best operation should be vented until the contents reach a predetermined temperature. The vessel should then be sealed against further escape of heated air and the temperature and pressure allowed to increase to desired values under which the vessel should usually be held for a predetermined length of time. At the end of the predetermined time the heating should be discontinued and the vessel and contents allowed to cool until the lid may be removed without danger. The pressure relief valve in such vessels may, during normal operation, not open at all or it may be the means of holding the pressure at a predetermined maximum.

In many instances it is extremely difficult to open the container at the end of the operation because of the high vacuum created during the operation. Frequently a long period of waiting is required before the pressures inside and out become fairly well equalized. This invention overcomes this difficulty.

Referring now to the drawing, in Fig. 1, numeral 1 is part of the casing of the pressure chamber as, for example, the lid of a pressure cooker. Into casing 1 is threaded valve body 3 which is of two parts, a cover 5 and a chamber 7 welded together at 9. A gasket 11 and nut 13 hold valve body 3 to casing 1 with a steam tight fit.

Threaded extension 15 on cover 5 is hollow and forms a passageway 16 from the interior of valve chamber 7 to the exterior of casing part 1. It also provides a guide as will be described.

Chamber 7 is provided with a shoulder 17 upon which rests the edge of a dished thermostatic disc 19 of the snap-acting type. Such discs are shown in Spencer Patent 1,448,240 and therefore will not be further described herein. Extending through a central opening 21 in disc 19 is a hollow valve stem 23. Valve stem 23 is threaded exteriorly as shown at 25 to carry a threaded weight 27 mounted thereon.

The weight 27 has a reduced portion 29 constituting a boss or shoulder which rests upon the area of disc 19 surrounding opening 21. This arrangement provides a lost-motion connection between the stem 23 and the disc. A lock nut 31 holds weight 27 in place on valve stem 23. By loosening nut 31, the weight 27 may be threaded up or down on valve stem 23. This changes the relative positions of valve stem 23 and disc 19.

The end of valve stem 23 opposite threaded portion 25 has a reduced wall thickness to form a shoulder 33 (see Fig. 5) and is slotted lengthwise at 34 to provide fingers 35 to hold valve ball 37. Ball 37 may rest on shoulder 33. Fingers 35 are bent within the diameter of ball 37 but need not firmly grip it, the ball being held loosely.

Chamber 7 carries a valve seat 39. Seat 39 is formed in a hollow bushing 41 threaded into the bottom wall of chamber 7. Packing washer 43 provides a leak-proof joint.

The end of valve stem 23 which contains ball 37 is guided freely in the hollow bushing 41 to seat ball 37 on valve seat 39. The threaded portion 25 of the valve stem 23 is loosely guided in passageway 16. In order to utilize gravity, the valve should be mounted as shown in Fig. 1, from the top of the pressure casing.

The operation of the Figs. 1-5 embodiment is as follows: The pressure vessel which includes casing 1 is tightly closed. The thermostatic disc 19 at normal temperatures is bowed upward as shown in Fig. 1. In this position valve stem 23 and weight 27 resting on disc 19 are adjusted so that ball 37 clears seat 39. Accordingly the valve is open while the vessel is at normal temperatures.

When heat is applied to the vessel the air within expands and escapes through the open valve via slots 34 to the interior of valve stem 23 and out passageway 16. When the temperature reaches a predetermined point such as, for example, 200° F., thermostatic disc 19 snaps to its position of opposite curvature (see Fig. 4). Weight 27 and valve stem 23 follow the movement of disc 19 until ball 37 seats on valve seat 39. This shuts the valve confining the air in the vessel. As the temperature subsequently continues to rise the pressure in casing 1 will also rise.

Weight 27 and the size of the orifice at seat 39 are proportioned so that weight 27 keeps the valve closed up to and at a predetermined pressure. Such a pressure for example may be that created by a temperature of say 250° F., corresponding to 30 pounds per square inch absolute. As this pressure is exceeded the valve opens relieving the pressure via slots 34 and passageway 16. Under these conditions valve 3 functions as a pressure regulating and safety valve.

The vessel and its contents may thus be held under the predetermined pressure for any desired length of time after which heating is discontinued and the vessel dissipates heat and cools. As the pressure falls below that referred to above, the weight 27 holds ball 37 on seat 39. As the temperature subsequently falls the pressure inside of the casing 1 also falls and a vacuum is created which tends to seat ball 37 more firmly on seat 39. With a valve of the usual type this would mean that the vessel would become increasingly difficult to open as the temperature decreases.

However, in the present device, when the temperature is reduced the point at which disc 19 snaps to its position of opposite curvature, the disc 19 assumes its Fig. 1 position. This lifts weight 27 and valve member 23 unseating ball 37 and breaking the vacuum. This equalizes the pressure inside and outside so that the vessel can easily be opened.

While the Fig. 1-5 embodiment utilizes gravity operating through weight 27, other types of construction may be employed. Where it is desired to mount valve 3 in a way so that gravity will not operate as, for example, on the side of the pressure vessel the alternative form of the invention shown in Fig. 6 may be utilized.

The Fig. 6 embodiment is similar to that of Figs. 1-5 but a spring 28 is held in compression between top 5 and a lock nut 30 on stem 23, which in turn bears against disc 19. A spacer 32 in chamber 7 loosely holds the periphery of disc 19 against shoulder 17.

The operation of the Fig. 6 embodiment is the same as that described above for the Fig. 1-5 embodiment. Spring 28 operates without the aid of gravity similar to the manner that weight 27 operated with gravity. Spring 28 keeps ball 37 seated on seat 39 after disc 19 snaps to its Fig. 4 position.

The operation of both the Fig. 1-5 embodiment and the Fig. 6 embodiment may be summerized as follows: When heat is applied to the pressure vessel valve 3 is normally open and vents air. At a predetermined temperature the disc 19 moves down and valve 3 closes. Pressure then builds up inside casing 1. At a predetermined point valve 3 opens and relieves and thus limits the pressure. When the heat is shut off valve 3 holds a vacuum until a predetermined temperature is reached at which disc 19 moves up. This opens the valve and breaks the vacuum seal.

Although a snap-acting dished disc 19 is shown, a creep-type thermal element or a snap-acting element of another type may be substituted. Such a creep-type element might be, for example, a bimetal strip with its edges resting on shoulder 17 and supporting weight 27 or spring 28, as the case may be.

It will be observed that in effect the valve, as shown in Fig. 5, in association with the means for biasing it shut (by means of the weight 27 or spring 28) constitutes a so-called safety or pop valve which responds to pressure in the pressure vessel in order to open. The thermostatic disc 19, which is responsive to the temperature in the same vessel when cool, prevents this safety valve from closing; and when hot, permits the safety valve to operate in response to pressure in the usual way. Thus by very simple means is obtained the condition that (1) air is vented and pressure is prevented from rising during incipient heating of the vessel contents; (2) safety valve pressure operation occurs after a predetermined temperature is reached; and (3) vacuum release is effected under cool conditions.

Figure 8:
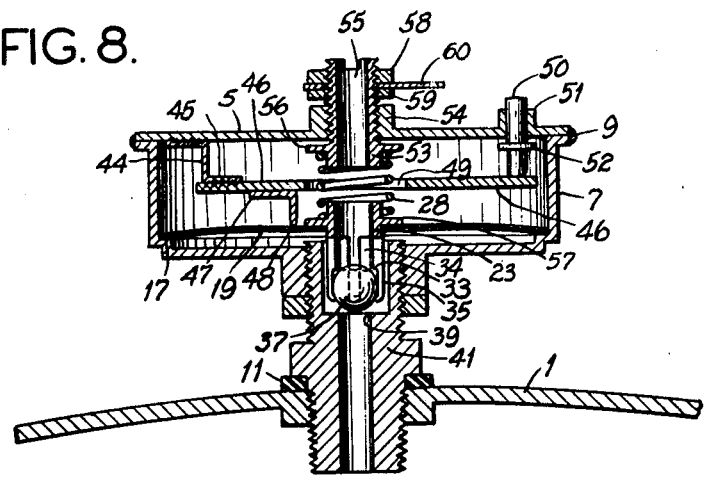
Fig. 8 is a section taken on line 8—8 on Fig. 7.

If desired, an indicating mechanism can be provided in the valve, as shown in Figs. 7 and 8. To the cover 5 is affixed, as by welding, soldering, or brazing, a Z-shaped bracket 44, made of relatively thin material so as to be flexible and resilient. Preferably this bracket should be a material capable of withstanding the corroding action of the steam and water vapor which may pass by it; for example, phosphor bronze. Attached firmly to the lower foot 45 of bracket 44 is one end of a rigid arm 46. Also attached to arm 46 is a finger 47. The lower end of finger 47 rests against disc 19. Preferably this lower end should be rounded as shown at 48 so as to provide a sliding engagement with the disc 19 to minimize friction. Arm 46 has a central hole 49 therein large enough to allow spring 28 to pass through the arm. Resting against the other end of arm 46 is an indicating pin 50 which extends upwardly through an embossed guide-hole 51 in cover 5. A flange 52 is provided on pin 50 in order to prevent pin 50 from dropping out and being lost.

In this embodiment there is also provided an adjustment by means of which the operating pressure of valve can be changed. A threaded screw plug 53 is mounted on cover 5 by means of the boss 54 the interior wall of which is threaded to provide a screw engagement with the threads of plug 53. Plug 53 has a cylindrical hole 55 formed therein to allow the exit of steam and air. Plug 53 is also provided with an outwardly extending flange 56 formed on its inner end, which flange provides a bearing surface for one end of spring 28. Valve stem 23 rests, as before, on disc 19 and is lifted by disc 19 by means of the flange 57. The other end of spring 28 bears against the top surface of flange 57. Two clamping nuts 58 and 59 are threaded on the upper threaded portion of plug 53, and clamped between them is a pointer 60. Suitable indicia 61 are provided on cover 5.

The operation of the indicator is as follows: When disc 19 is heated, it snaps to its position of opposite curvature as shown in Fig. 4, and finger 47 follows the disc to this position. Arm 46 is thus allowed to pivot by means of flexible bracket 44 so that the outermost end of arm 46 moves away from guide-hole 51 and thus allows pin 50 to move inwardly in the casing. When disc 19 has cooled and snapped to the position shown in Fig. 8, the disc pushes finger 47 thus swinging arm 46 to cause pin 50 to project outwardly from cover 5 and thus indicate that the disc has cooled and snapped.

In regard to adjusting the pressure at which valve 3 will relieve, when plug 53 is screwed inwardly or outwardly, the spring pressure applied to stem 23 and thus to ball 37 becomes greater or less, and thus changes the pressure required to open valve 3 to raise or lower the pressure, respectively. The actual change in spring pressure applied to ball 37 to change the relieving pressure from 15 to 30 pounds absolute, is a matter of a few ounces, due to the small surface area of ball 37 subtended by the valve seat 39. This change of a few ounces on disc 19 will change its operating temperature but a few degrees at most, due to the much greater force exerted by the disc when it is ready to snap in either direction.

If desired, for better thermal conductivity, chamber 7 can be formed as an integral part of casing 1.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A relief valve comprising a casing having an outlet and adapted to be attached to the wall of a heated pressure vessel, said casing having a valve port communicating interiorly with the vessel and exteriorly with said outlet, a valve, a hollow stem supporting the valve and having openings in the stem behind the valve, means biasing said stem toward a position to seat the valve at the port, a snap-acting thermostatic disc having a central opening freely accommodating the stem, means supporting the edge of said disc within the casing, said disc in normal cool position being bowed away from said port, a shoulder associated with the stem adapted to be engaged by the thermostatic disc when in cool position to unseat the valve, said thermostatic disc being movable with a snap action to a position of opposite curvature in which the valve is seated to close the port under its bias without further cooperation between the disc and the shoulder until said disc returns to its normal cool position of curvature to engage the shoulder and move the stem against its bias to reopen said valve.

2. A relief valve comprising a casing having an outlet and adapted to be attached to the wall of a heated pressure vessel, said casing having a valve port communicating interiorly with the vessel and exteriorly with said outlet, a valve, a hollow stem supporting the valve and having openings behind it, a weight attached to the stem for biasing the valve to seat and close the port, a snap-acting thermostatic disc having a central opening freely accommodating the stem, means supporting the edge of said disc within the casing, said disc in normal cool position being bowed away from said port, shoulder means associated with the stem and resting upon the thermostatic disc only in the bowed position of the latter and so related to the valve that when said disc is in cool position the valve is spaced from the port, said thermostatic disc being movable with a snap action to a position of opposite curvature in which the valve is seated to close the port under the bias of said weight without further cooperation between the disc and the stem.

3. A relief valve adapted to vent a heated pressure vessel, comprising a valve member movable between open and closed positions with respect to an outlet for the vessel and biased toward closed position, a snap-acting thermostatic means having a lost-motion connection with said valve member for controlling it in response to temperature within the vessel, said means having a first position wherein it engages and holds said valve member open against its bias when said temperature is below a substantially predetermined value, and a second position wherein it is disengaged from and releases said valve member so that the latter is biased closed when said temperature is above said value, said lost-motion connection permitting said valve member to move to open position against its bias independently of said thermostatic means in response to excessive pressure in said vessel when said thermostatic means is in its said second position.

4. A relief valve adapted to vent a pressure cooker or the like, comprising a valve member movable between open and closed positions with respect to an outlet for the cooker and biased toward closed position, a snap-acting thermostatic means having a lost-motion connection with said valve member for controlling it in response to temperature within the cooker, said means having a first position wherein it engages and holds said valve member open against its bias until said temperature rises to a value approaching the boiling point, and a second position wherein it is disengaged from and releases said valve member so that the latter is biased closed when said temperature is above said value, said lost-motion connection permitting said valve member to move to open position against its bias independently of the thermostatic means in response to excessive pressure in said cooker when said thermostatic means is in its said second position.

5. A relief valve for venting a heated pressure vessel, comprising a valve member movable between open and closed positions with respect to an outlet for the vessel, a weight biasing said valve member to closed position, a snap-acting thermostatic plate having a lost-motion connection with said valve member for controlling said valve member in response to temperature within the vessel, said plate having a first position wherein it raises said weight and holds said valve member open when said temperature is below a substantially predetermined value, and a second position wherein it releases said weight to bias said valve member closed when said temperature is above said value, said lost-motion connection permitting said valve member and weight to move independently of said plate to open position in response to excessive pressure in said vessel when said plate is in its said second position.

6. A relief valve for venting a heated pressure vessel comprising a valve member movable between open and closed positions with respect to an outlet for the vessel, spring means biasing said valve member to said closed position, a snap-acting thermostatic plate having a lost-motion connection with said valve member for controlling said valve member in response to temperature within the vessel, said plate having a first position wherein it opposes said spring means and holds said valve member open when said temperature is below a substantially predetermined value, and a second position wherein it releases said spring means to bias said valve member closed when said temperature is above said value, said lost-motion connection permitting said valve member to move independently of said plate against the bias of said spring means to open position in response to excessive pressure in said vessel when said plate is in its second position.

7. A relief valve adapted to vent a heated pressure vessel, comprising a valve member movable between open and closed positions with respect to an outlet for the vessel and biased toward closed position, a thermostatic element having a lost-motion connection with said valve member for controlling said valve member in response to temperature within the vessel, said element having a first position wherein it holds said valve member open against its bias when said temperature is below a substantially predetermined value, and a second position wherein said valve member is released and biased closed when said temperature is above said value, said lost-motion connection permitting said valve member to move to open position against its bias independently of said thermostatic element in response to excessive pressure in said vessel when said thermostatic element is in its said second position, means for adjusting the amount of bias upon said valve member, and means for indicating the position of said thermostatic element.

8. A relief valve comprising a valve body having a valve port, a snap-acting thermostatic plate carried by the valve body to snap between a position bowed toward the port and a position bowed away from the port, a valve member movable toward and away from the port through an aperture in the plate and biased toward the port to close it, said valve member being adapted for engagement by the plate when the latter is in one of said two bowed positions to be held open against its bias, the plate being disengaged from the valve member when in its other bowed position to release the valve member to be biased toward the valve port to close the latter.

9. A relief valve comprising a valve body having a valve port, a dished, snap-acting thermostatic disc peripherally supported by the valve body to snap between a position bowed toward the port and a position bowed away from the port, a valve member having a stem extending loosely through an aperture in the disc for movement toward and away from the port and biased toward the port to close it, said stem having a shoulder on the side of the disc opposite the port engageable by the disc when the latter is in position bowed away from the port to hold the valve member away from the port, the disc being disengaged from the shoulder when in its position bowed toward the support to release the valve member to be biased toward the valve port to close the latter.

JOHN O. MOORHEAD.

REFERENCES CITED

The following references are of record in the file of this patent:

UNITED STATES PATENTS

| Number | Name | Date |
| --- | --- | --- |
| 1,076,159 | Schutt | Oct. 21, 1913 |
| 1,773,698 | Spencer | Aug. 19, 1930 |
| 1,972,169 | Spencer | Sept. 4, 1934 |
| 2,046,187 | Saul | June 30, 1936 |
| 2,268,359 | Tustin et al. | Dec. 30, 1941 |
| 2,300,825 | Bloom et al. | Nov. 3, 1942 |
| 2,333,993 | Frailing | Nov. 9, 1943 |

FOREIGN PATENTS

| Number | Country | Date |
| --- | --- | --- |
| 519,568 | Great Britain | Apr. 1, 1940 |